July 14, 1959  E. VOGT ET AL  2,895,103

MAGNETIC TESTING APPARATUS

Filed March 12, 1956  2 Sheets-Sheet 1

July 14, 1959 E. VOGT ET AL 2,895,103
MAGNETIC TESTING APPARATUS
Filed March 12, 1956 2 Sheets-Sheet 2

United States Patent Office 2,895,103
Patented July 14, 1959

2,895,103

MAGNETIC TESTING APPARATUS

Ernst Vogt, Wallisellen, and Fritz Diemer, Meilen, Switzerland, assignors to Societe Technique pour l'Industrie Nouvelle S.A. (Stin), Vevey, Switzerland Application March 12, 1956, Serial No. 570,735

Claims priority, application Switzerland March 12, 1955

12 Claims. (Cl. 324—34)

The present invention relates to magnetic testing devices and more particularly to devices for the magnetic detection of faults in elongated articles or bodies made from magnetizable material.

A magnetic testing apparatus of this kind may comprise a testing unit which is adapted to receive the article or body to be tested and to magnetize it and in which is incorporated an element sensitive to faults in the said body or article, and it may further comprise a measuring unit in which the indications of said fault-sensitive element are measured, evaluated and also may be recorded. In known apparatus of this kind, the magnetic field serving to magnetize the said article or body is produced either by direct current or by alternating current.

Besides these installations in which the article or body to be tested is magnetized in the testing unit, there are others which for the detection of faults rely on the magnetic remanence of the article, this having been previously magnetized either by means of direct current or by means of permanent magnets.

The fault-sensitive element preferably is an induction coil which surrounds the article to be tested at any appropriate place. Such coils, known as measuring coils, may comprise two or more parts, whereby on one hand they can easily be placed round the said article and on the other hand they can provide some indications of the position of any fault within the article.

It has also been proposed to reciprocate the measuring coil or coils lengthwise of the elongated article or body to be tested, e.g. a steel cable. This has the advantage that in an apparatus in which a stationary field is provided by direct current excitation, measurements can also be effected without displacing the article in relation to the testing unit.

As a common feature of all these known kinds of magnetic testing apparatus it may be said that the measuring coils are either completely exposed, or surrounded by an excitation coil without a closed ferro-magnetic circuit. Moreover, the measuring unit simply receives the voltage generated in the measuring coils.

It has been found that external influences arising for instance from parts made from ferro-magnetic material which pass in the vicinity of the testing unit, such as steel cables, structural members made from steel or iron and the like, may severely disturb the measurements and in certain instances may falsify the readings by amounts of the same order as the values which indicate the presence of a fault in the article or body to be tested.

One of the objects of the present invention is to provide a testing unit which is substantially shielded from external magnetic influences and therefore can be highly sensitive. This is accomplished by completely closing the magnetic circuit of the excitation coil by means of a ferro-magnetic casing along its external periphery, only a narrow air gap of small magnetic saturation being left between the testing unit and the article to be tested. Thus, a homogeneous field exists within the unit in the region of the measuring coil or coils, and this field cannot be disturbed by external influences.

Another object of the invention is to provide a testing unit which can be divided lengthwise, so that it is possible to use it for fault-detecting in very long bodies such as the cables of cable railways, elevators, and the like, by assembling the unit around such cables. This will also enable the unit to be used for testing endless cables, which could not be drawn through closed tubular units.

A further object is to provide an improved construction for the excitation coil or coils in such a lengthwise divisible unit, such construction providing accurate location of the several half-windings which the divisible coil comprises, and also ensuring that the cooperating ends of opposite half-windings are pressed against each other under such predetermined pressure as is required for the unhampered passage of the excitation current from each half-winding to the next throughout the coil. In a preferred embodiment of the invention, this is accomplished without resorting to self-resilient half-winding conductors which would have to be made of a mechanically strong alloy such as beryllium bronze, the ohmic resistance of which is much greater than that of pure copper. Accordingly, it is also an object of the invention to provide a lengthwise divisible excitation coil which is remarkable for its small dimensions and low temperature under high loads.

Still another object of the invention is to provide an effective arrangement and construction of the measuring coil whereby the axial position of the faults detected in the body under test can be located accurately.

Further objects, features and advantages of the present invention will become apparent from the description now to follow, of two embodiments thereof, given by way of example only, which embodiments will be described with reference to the accompanying drawings in which.

Figure 1:
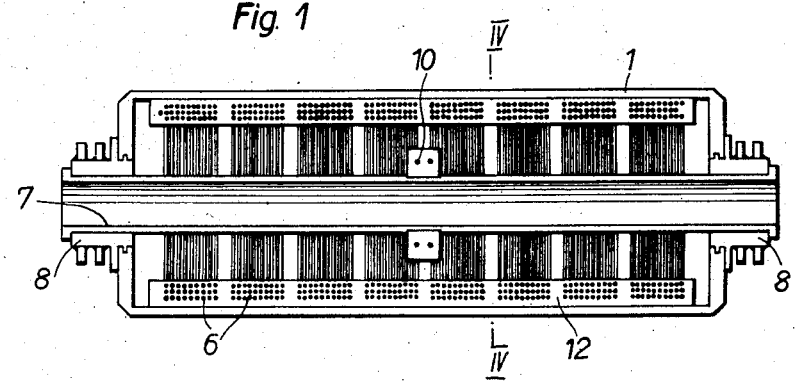
Fig. 1 is a view from above of the lower half of a first embodiment of the magnetic testing unit according to the invention.
Figure 4:
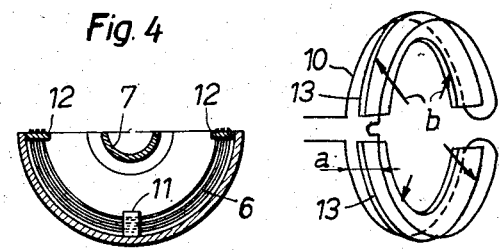
Figures 3, 3A:
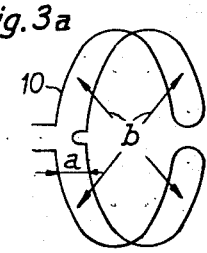
Figure 5:
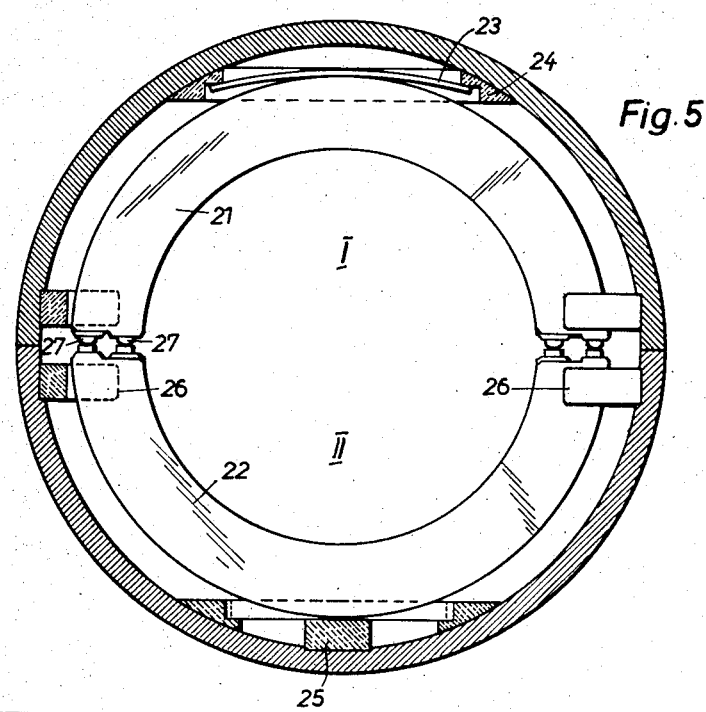
Figure 6:
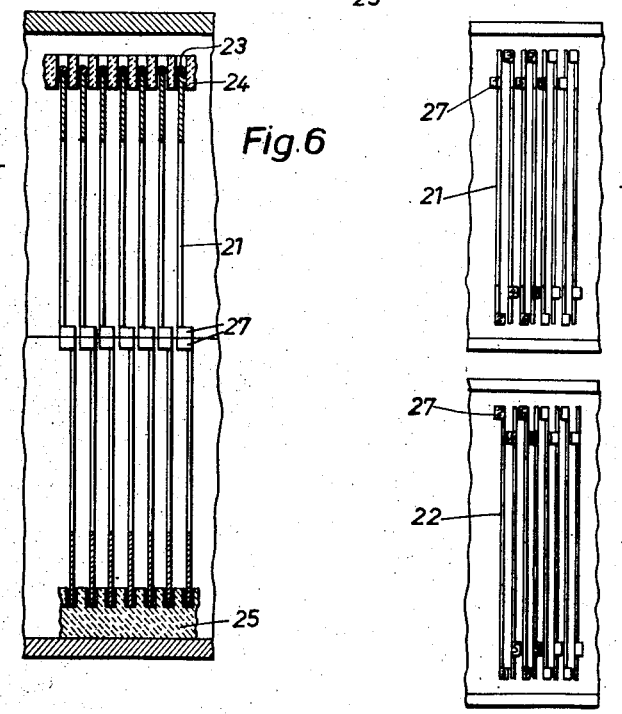
Figure 7:
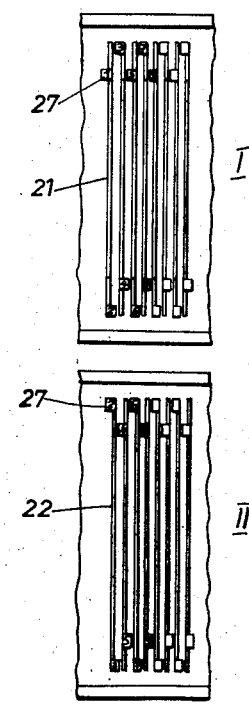

Fig. 3 schematically shows a conductor loop of the measuring coil provided in the said embodiment;

Fig. 3a schematically shows a conductor loop of the measuring coil provided with a magnetic core;

Fig. 4 is a cross-section on line IV—IV of Fig. 1;

Fig. 5 is a cross-section through the casing and excitation coil of a second embodiment of said magnetic testing unit;

Fig. 6 is a vertical longitudinal section through a portion of the casing and excitation coil shown in Fig. 5, in a somewhat schematical and simplified representation; and Fig. 7 schematically shows corresponding portions of the upper and lower half of the said casing and excitation coil, as seen from their inside before assembly.

Figure 2:
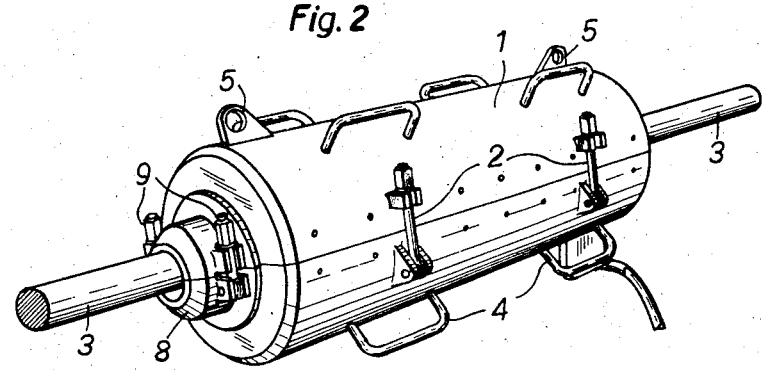
Fig. 2 is a perspective view of the said embodiment as completely assembled for fault-detecting in a cable.

The magnetic testing unit shown in Figs. 1 to 4 comprises a tubular casing 1 made from ferro-magnetic material, which is divided into two substantially semi-cylindric halves along an axial plane. As shown in Fig. 2, the two halves abut each other at their longitudinal edges and are dismountably connected to each other by screws 2. The casing 1 is provided with handles 4 to facilitate handling of the unit, and with eyes 5 for suspending the unit. The casing 1 contains an excitation coil 6 (Fig. 1) which is arranged coaxially with the casing and which is divided into two halves along the same axial plane as the casing. The excitation coil 6 comprises a great number of windings, each of which is divided into two semi-circular half-windings made from resilient material such as beryllium bronze wire, each half-winding being fixed at its middle in an insulating block 11 (Fig. 4) and its ends being guided in holes of insulating plates 12. When the two halves of the casing 1 and of the coil 6 are assembled, the ends of the opposite half-windings abut each other. While being so assembled, the ends of the opposite half-windings suffer a slight relative displacement by which their surfaces of mutual contact are cleaned. Because each half-winding is somewhat resilient and is fixed only in its middle, the ends of the opposite half-windings remain pressed against each other, which ensures good electric contact between them, so that a continuous circuit is provided throughout the excitation coil 6.

Coaxially with the casing 1 and the coil 6 a guide tube 7 consisting at least in part of non-magnetic material is supported in terminal rings 8. The internal diameter of the guide tube 7 preferably is only little greater than the outer diameter of the cables or other elongated articles to be tested. Both the guide tube 7 and the terminal rings 8 are also divided into halves along the same axial plane as the casing 1 and the coil 6. The terminal rings 8 are retained in corresponding openings at both ends of the casing 1. Screws 9 (Fig. 2) are provided for holding together the two halves of each ring 8 even when the upper half (Fig. 2) of the casing 1 and of the coil 6 has been removed.

Half-way along the length of the excitation coil 6 and coaxially within the latter, the guide tube 7 supports a measuring coil 10 which again is divided into two halves along the same plane as the parts 1, 2, 7 and 8. Fig. 3 diagrammatically shows the conductor arrangement in the measuring coil, only one loop of the coil being shown for clarity's sake. This loop may be described as comprising two pairs of half-windings, in which each half-winding of one pair lies in the same radial plane as one of the half-windings of the other pair. At one of their ends, the two half-windings of each pair are connected to each other; the opposite ends of the two half-windings which lie in one of the said radial planes are connected to each other, while the opposite ends of the two half-windings lying in the other radial plane serve to connect the loop to an interpreting and or recording device (not shown). Therefore any current induced in the loop passes first through one of the half-windings of one pair and back through the other half-winding of the same pair, then through the half-winding of the other pair which is in the same radial plane as the second half-winding of the first pair, and finally back through the other half-winding of the second pair. Accordingly, this current does not effectively encircle the axis of the coil or any flux component passing through the measuring coil, but it encircles practically the whole of the radial flux components, indicated by the arrows $b$, in a zone of comparatively short axial width. The measuring coil 10 either may be an air-core coil (Fig. 3), or it may comprise a ferro-magnetic core 13 in the shape of two semi-annular disks 13 (Fig. 3a) each lodged between the two half-windings of one pair.

In the embodiment shown, the measuring coil 10 is accurately located on the guide tube 7 by supporting members engaging a shallow annular groove in the outer surface of the tube 7, so that it is symmetrically positioned with respect to the length of the excitation coil 6.

If desired, a plurality of such measuring coils could be provided, or the measuring coil 10 could comprise more than one winding. The width $a$ of the loop or loops, as measured in an axial direction across the radial flux encircled, should be less than 0.4 inch, and the diameter of the half-windings of the loop or loops should be greater than 1.2 the internal diameter of the guide tube 7.

The described construction of the magnetic testing unit renders it possible, by separating the two halves of each of its members from each other, to mount it easily on endless cables or ropes 3 with the latter running through the axial passage of the guide tube 7, as shown in Fig. 2.

In operation, a direct current is caused to flow through the windings of the excitation coil 6, so as to set up a magnetic field in the substantially closed ferro-magnetic circuit formed by the cable 3 running through the guide tube 7, the terminal rings 8 and the ferro-magnetic casing 1. This magnetic field is given such an intensity that the cable 3 is axially magnetized up to saturation, that is, up to more than 15,000 gauss. The cable 3 is drawn axially through the testing unit, or the latter is displaced along the cable, at a convenient speed. As long as the cable 3 does not have any faults and therefore is magnetically homogeneous, this axial displacement of the cable 3 relatively to the testing unit will cause no variation of the magnetic flux through the loop or loops of the measuring coil 10, and therefore, no voltage is induced in the latter. Only a magnetic inhomogeneity, which may indicate a fault in the cable 3, will cause the magnetic field to vary, and as this variation becomes effective in the measuring coil 10 owing to the displacement of the cable 3 through the unit, will induce a voltage in the measuring coil 10. For measurement, both the axial and the radial components of the field could be relied upon for inducing said voltage, but as a rule it is preferable to rely only on the variation of the radial component $b$ (Fig. 3) because this is substantially less affected by any mere variations of the current passing through the excitation coil 6. Owing to the comparatively narrow opening $a$ of the measuring coil loop 10, the cable 3 is tested in successive zones of small axial length as it moves relatively to the unit, so that any inhomogeneity of the cable can be located accurately.

If a core of ferromagnetic material, such as that known under the trade name "Permalloy," transformer iron, or the like, is arranged in the measuring coil 10 as shown in dash-and-dot lines at 13 (Fig. 3), the effective measuring zone becomes still narrower than if the measuring coil 10 had an air core, while the sensibility remains unaffected or even is improved. By an adequate arrangement of the said measuring coils, it is possible to compensate entirely the effects of the axial components of the field. However, because the loops in practice do not have strictly the same dimensions, single wires could still embrace certain parts of the axial magnetic flux, so that a disturbing voltage can be induced in the measuring coil mainly when the excitation current is switched on and off. This disturbing voltage can be compensated by an additional loop of suitable size, which also embraces parts of the axial flux.

The electric voltage induced in the measuring coils not only depends on the kind, position and extent of the faults in the cable but also on the speed of relative displacement between the testing unit and the cable or other article to be tested. In order to obtain indications which result only from the features of the defective portion of the cable, i.e. from the field produced by the fault, it is necessary to eliminate the influence of the relative speed. If for instance a defective zone of given size is situated near the surface, the spreading of the field in the region of the fault differs from that which would result if a defective zone of the same size were situated farther inwards, e.g. at the center, of the cable; in the former instance, the field gradient is greater than it would be in the latter instance. Although the amplitude of the variation of the field intensity is the same in both instances, the induced voltage will be different for a given speed of relative displacement between the cable and testing unit, because the field gradient is different in the two instances. However, because the field intensity is proportional to the time integral of the induced voltage, it is possible by integrating the tension recorded, to calculate the field intensity, and therefore the extent of the defective zone.

If the arrangement is responsive to the radial components of the flux, the first time integral of the voltage will indicate the radial component of the field intensity. By further integration, the total field disturbance could be ascertained, because the radial component is the first derivative of the total field intensity. However, a second integration is not absolutely necessary because the radial component already gives a sufficient indication on the size of the defect.

The field thus measured and the variation in the cross-section of the body to be tested are related to each other through the magnetic properties of the material from which that body is made, but this factor can be eliminated by appropriate calibration of the indicating instrument.

The integration can be effected either by an electronic or by a ballistic integrator. However, it is very important for the accuracy of the measurements, especially if the defective zones are elongated as they are, for instance, when they are due to corrosion, that the time constants of the integrators are large, i.e. that they amount to several seconds. It must also be noted that the relative speed between the body to be tested and the testing unit may amount to several yards per second and one or more faults may be present every few inches. This requires a very quick response of the recording instrument.

Obviously, evaluation by calculation could be rendered possible by simultaneous recording of the tension and of the relative speed.

The voltages or energies obtained from the measuring coils are comparatively small. For measurement by industrial means, it is necessary to amplify the voltages and the amplification must be substantially independent from the frequency, in order to obtain accurate results even with very low frequencies, i.e. small relative speeds. The output of the amplifier and integrating unit preferably is fed to a quickly-responding direct-writing recording instrument as indicated above.

In order to make the recording, i.e. the rate of feed of the recording paper, independent from time, it is advantageous to cause the paper to be fed at a rate proportional to the relative displacement between the testing unit and the body to be tested. For that purpose, the testing unit may be provided with a measuring roller rotatably supported thereon, which roller could be connected to the paper-feeding device either mechanically, or electrically by means of any known telecontrol system such as self-synchronous motors, or the like. The lengths in the records thus obtained then will be in accurate proportion to the lengths measured on the body to be tested, so that when repeated measurements are effected on the same body, e.g. a cable, the recorded diagrams can simply be superposed for mutual checking, irrespective of the speed at which the individual diagrams had been obtained. In order to have nevertheless an indication on the recording speed, time marks may be recorded additionally.

Referring now to the alternative embodiment shown in Figs. 5 to 7, it will be seen that the testing unit partly shown therein comprises an excitation coil consisting of half-windings 21 in the upper half of the tubular casing 1 and of half-windings 22 in the lower half of that casing. The half-windings 21 are resiliently mounted in the upper casing half while the half-windings 22 are immovably located in the lower casing half.

The half-windings 21, 22 each consist of a semiannular plate, made for instance by stamping from copper sheet, so that they are narrow in the axial direction and wide in the radial direction. Thus, they are substantially rigid radially and take little axial space. Their production by stamping ensures that all the half-windings will have the same shape and dimensions.

The upper half-windings 21 are guided laterally at their ends in the slots of two comb-shaped blocks 26, made from insulating material and supported in the upper casing half. A further, grid-shaped insulating block 24 is mounted in the uppermost part of that casing half and its slot are engaged by the half-windings 21 in the central portion of their outer periphery. In each of these slots, a substantially straight piece of spring wire is lodged in such a way that it runs over the peripheral surface of the corresponding half-winding while its ends are retained by appropriate abutments in the block 24. This spring is flexed upwards by the half-winding 21 when the two halves of the casing are assembled, and thus maintains the said half-winding resiliently pressed downwards.

The lower half-windings 22 are mounted in a similar way as the upper ones, being laterally located by comb-shaped insulating blocks 26 at their ends and by a grid-shaped insulating block 25 in the central portion of their outer periphery. However, instead of containing spring wires as does the upper grid-shaped block 24, this lower block 25 has an integral ledge extending across its slots and against the top of which the half-windings 22 abut when pressed downwards as the two halves of the casing are assembled.

At each of its ends, each of the half-windings 21, 22 has a lateral projection carrying a silver contact 27. As schematically shown in Figs. 6 and 7, the contact 27 at one end of each upper half-winding 21 is on the inner half of the end face and axially offset to one side of the plane of the half-winding, while at the other end of the same half-winding the contact 27 is on the outer half of the end face and axially offset to the opposite side of said plane. Each of these upper half-windings 21 is mounted in reversed position as compared with the adjacent one, so that the contacts 27 on the similarly positioned ends of the upper half-windings 21 are alternately on the inner and on the outer halves of the respective end faces of these half-windings and all are offset to the same side of the planes thereof, as best seen in the upper half of Fig. 7.

The contacts 27 on the two ends of each lower half-winding 22 also are axially offset one to one side and the other to the opposite side of the plane of that half-winding, but they are both either on the inner half or on the outer half of the corresponding end face, as shown in the lower half of Fig. 7. These lower half-windings 22 are positioned in the lower half of the casing in such a way that their planes are half-way between the planes of the planes of the upper half-windings 21 when the two casing halves are assembled, as shown in Fig. 6. Moreover, the lower half-windings 22 having their two contacts 27 on the inner half of their end faces alternate with those having their two contacts 27 on the outer half of their end faces so that these contacts form a pattern which is congruent to that of the contacts 27 on the upper half-windings 21; however, the contact at each end of any of the lower half-windings 22 is axially offset, with respect to the plane of that half-winding, to the side opposite to that to which the contact on the corresponding end of an upper half-winding 21 is offset with respect to the plane of the latter.

This arrangement makes it possible to maintain a very small axial distance between adjacent half-windings in the same casing half and to provide fairly large contact surfaces while preventing adjacent contacts of the same set from interfering with each other. Moreover, it is thus possible to arrange each half-winding 21, 22 in a strictly radial plane although due to the axially offset arrangement of the contacts 27 a generally helical path is provided for the current throughout the excitation coil formed by these half-windings. It will be seen from Figs. 6 and 7 that the current enters the first upper half-winding 21 at the left of the inner half of its forward end (not shown in Fig. 6, top left in Fig. 7) and leaves that first half-winding at the right of the outer half of its rearward end to enter the first lower half-winding 22 at the left of the outer half of its rearward end (first pair of contacts 27 from the left in Fig. 6 and in the central portion of Fig. 7). Thereafter, the current passes from the contact at the forward end of that first lower half-winding (not shown in Fig. 6, bottom left in Fig. 7), which contact is on the outer half of that end face and offset to the right, to the cooperating contact of the second upper half-winding 21 (not shown in Fig. 6, second contact from the left at the top of Fig. 7). It leaves that second upper half-winding 21 through a contact which is on the inner half of the rearward end face and axially offset to the right thereof and enters the second lower half-winding 22 through a correspondingly positioned contact which is axially offset to the left thereof (second pair of contacts 27 from the left in Fig. 6 and in the central portion of Fig. 7), and so on through all the upper and lower half-windings of the excitation coil.

It will be seen that the corresponding contacts 27 of the upper and lower half-windings are firmly pressed against each other by means of the spring wires 23 which press the upper half-windings 21 downwards in their guiding slots in the blocks 24 and 26.

While providing the contacts 27 in the same positions as shown in Figs. 5 to 7, the same result could be obtained by mounting the half-windings 21, 22 at a small angle from the strictly radial planes, so that the planes of the half-windings would pass through the centers of the respective contacts; thus, these contacts would no longer be axially offset to one or the other side of the plane of the half-winding which carries them. This oblique positioning of the half-windings could be accomplished by providing the slots in the insulating blocks 26 at positions slightly differing from those required for the arrangement shown in the drawing.

Also, it would be possible to mount the lower half-windings 22 resiliently in the same way as described for the half-windings 21. Due to the fact that pressure on one contact of a half-winding will cause the contact on the opposite end of that half-winding to be pressed against its counter-part as well, by slight rocking of that half-winding, it is also permissible to mount resiliently, in the described manner, only alternate half-windings of the upper and/or lower set, or only every third half-winding 21 of the upper set and every third half-winding 22 of the lower set.

We claim:

1. In a magnetic testing apparatus for elongated articles, a tubular casing of ferro-magnetic material, an excitation coil coaxially mounted in said tubular casing, and a measuring coil coaxially supported in said tubular casing within said excitation coil, said tubular casing, excitation coil and measuring coil each having two halves symmetrical on an axial plane, and means on and dismountably connecting the two halves of said tubular casing to each other, the tubular casing constituting both a mechanical shield and a magnetic path for reducing magnetic reluctance.

2. In an apparatus for magnetically testing elongated articles, a tubular guide comprising a pair of semi-cylindric half-guides dismountably assembled with their longitudinal edges in abutting relationship, a tubular casing comprising a pair of semi-cylindric half-casings made from ferro-magnetic material dismountably assembled with their longitudinal edges in abutting relationship, said tubular casing coaxially encompassing said tubular guide, an excitation coil coaxially encircling said tubular guide within said tubular casing and comprising a first set of substantially semi-circular half-winding conductors each supported in but insulated from one of said half-casings, a second set of substantially semi-circular half-winding conductors each supported in but insulated from the other of said half-casings, each of the said conductors of one set being held for endwise abutment at its one end with one, and at its opposite end with another, of the said conductors of the other set, and a measuring coil coaxially mounted on said tubular guide within said excitation coil and comprising two half-coils each mounted on one said half-guides.

3. Apparatus as claimed in claim 2 in which at least part of the said semi-circular half-winding conductors are flexible in their radial planes, each such conductor having a central portion fixed to but insulated from its said supporting half-casing and a pair of end portions each extending and displaceably guided in a direction perpendicular to the plane of mutual abutment of the said two half-casings, adjacent to one of the longitudinal edges of said half-casing.

4. Apparatus as claimed in claim 2 comprising, in at least one of the said half-casings, a pair of insulating members each fixed inside said half-casing adjacent one of the longitudinal edges thereof, and a third insulating member fixed inside said half-casing in an angular position intermediate that of said first two insulating members, each of the said semi-circular half-winding conductors supported in said half-casing being flexible in its radial plane and extending through the said three insulating members with its end portions slidably guided each in one of the said first two insulating members for displacement in a direction perpendicular to the plane of mutual abutment of the two half-casings.

5. Apparatus as claimed in claim 2 in which the said semi-circular half-winding conductors are substantially rigid in their radial planes and slidably guided each in its supporting half-casing in a plane perpendicular to the plane of mutual abutment of the said two half-casings, said apparatus further comprising spring means each interposed between one of said half-winding conductors and its supporting half-casing and adapted to press said half-winding conductor towards the plane of mutual abutment of the said two half-casings for maintaining its ends in abutting contact each with one of the ends of two half-winding conductors supported in the other half-casing.

6. Apparatus as claimed in claim 2 comprising, in each of the said half-casings, a pair of insulating members each fixed inside said half-casing adjacent one of the longitudinal edges thereof, and a third insulating member fixed inside said half-casing in an angular position intermediate that of said first two insulating members, each of said insulating members having slots for slidably retaining said semi-circular half-winding conductors each in a plane perpendicular to the plane of mutual abutment of the said two half-casings, spring means each interposed between one of at least some of said half-winding conductors and the said third insulating member in which such conductor is slidably retained, said spring means being adapted to press such conductor towards the plane of mutual abutment of the said two half-casings for maintaining its ends in abutting contact each with one of the ends of two half-winding conductors supported in the other half-casing.

7. Apparatus as claimed in claim 2 in which the said half-winding conductors supported in one of the said half-casings and the said half-winding conductors supported in the other of the said half-casings are situated in radial planes axially offset in relation to each other, each of the said half-winding conductors having at its one end a contact surface axially offset to one side of the radial plane in which this conductor is situated, and at its other end a contact surface axially offset to the opposite side of said radial plane, the said conductors supported in one of the said half-casings and those supported in the other of the said half-casings abutting each other by their said contact surfaces.

8. Apparatus as claimed in claim 2 in which the said half-winding conductors in each of the said two sets are situated in planes perpendicular to the plane of mutual abutment of said half-casings, the plane in which each of the conductors of one set is situated forming an angle with the plane in which each of the conductors of the other set abutting the first said conductor at its ends is situated.

9. A magnetic testing apparatus as claimed in claim 2, in which each half-coil of the measuring coil comprises a pair of semi-circular half-winding conductors the axial distance between which does not exceed 0.4 inch.

10. A magnetic testing apparatus as claimed in claim 2, in which each half-coil of the measuring coil comprises semi-circular half-winding conductors the diameter of which is at least 1.2 times the internal diameter of said tubular guide.

11. A magnetic testing apparatus as claimed in claim 2, in which each half-coil of said measuring coil comprises a radially extending ferro-magnetic core.

12. A magnetic testing apparatus as claimed in claim 2 in which said measuring coil is an air-core coil.

References Cited in the file of this patent

UNITED STATES PATENTS

| | | |
|---|---|---|
| 1,860,859 | Keinath | May 31, 1932 |
| 2,111,210 | Ebel | Mar. 15, 1938 |
| 2,550,951 | Young | May 1, 1951 |
| 2,558,485 | Gow | June 26, 1951 |
| 2,582,437 | Jezewski et al. | Jan. 15, 1952 |
| 2,685,672 | Price et al. | Aug. 3, 1954 |